2,832,667

ARSENIC FLUOROSULFONATE

Earl L. Muetterties, Hockessin, Del., assignor to E. I. du Pont de Nemours and Company, Wilmington, Del., a corporation of Delaware No Drawing. Application May 31, 1955
Serial No. 512,278

2 Claims. (Cl. 23—50)

This invention relates to a new composition of matter and methods for its preparation. More particularly, it relates to a new inorganic fluorosulfonate and methods for its preparation.

The fluorosulfonates of a number of elements are known, but they have certain properties or characteristics which make them unsuitable for use in selected applications. The known inorganic fluorosulfonates, i. e., salts of fluorosulfonic acid with metals or metalloids, are all solids, and this makes them difficult to handle in certain applications. Furthermore, they are all relatively unstable to heat. All the hitherto known fluorosulfonates decompose completely below 500° C. Such thermal instability makes the purification of these fluorosulfonates by distillation difficult.

It is an object of this invention to provide a new composition of matter and methods for its preparation. A further object is to provide a new inorganic fluorosulfonate and methods for its preparation. Another object is to provide an inorganic fluorosulfonate which is liquid at room temperature. Still another object is to provide a liquid fluorosulfonate of sufficient thermal stability to permit purification by distillation. Other objects will appear hereinafter.

These and other objects of this invention are accomplished by providing the novel inorganic fluorosulfonate, arsenic fluorosulfonate. Arsenic fluorosulfonate is a liquid at room temperature and can be distilled at atmospheric pressure without decomposition.

Arsenic fluorosulfonate is prepared by contacting and reacting arsenic trifluoride with sulfur trioxide. Reaction takes place instantaneously at room temperature of about 20° C. with the evolution of heat. However, the reaction conditions are not critical. An excess of either sulfur trioxide or of arsenic trifluoride can be used. It is preferable to use at least one mole of arsenic trifluoride for each two moles of sulfur trioxide, and especially a stoichiometric excess of arsenic trifluoride, since excess sulfur trioxide results in increasing amounts of the very toxic pyrosulfuryl fluoride formed as a by-product.

Likewise, the temperature and the pressure at which the reaction is carried out are not critical. The reaction can be carried out at atmospheric, superatmospheric or subatmospheric pressures and at any temperature from about 0° C. up to 700° C. A preferred manner of carrying out the reaction is at reflux temperature of the reaction mixture which can be accomplished by adding sulfur trioxide to arsenic trifluoride in a reaction vessel at such a rate that the reaction mixture refluxes mildly. Under these conditions, the initial reaction temperature is about 50–60° C., and the temperature gradually increases as arsenic fluorosulfonate is formed.

Sulfur trioxide of good purity is available commercially and is satisfactory for use in the process of this invention. Arsenic trifluoride of good purity can be prepared by the reaction of calcium fluoride, arsenic trioxide, and concentrated sulfuric acid. Anhydrous reactants are preferred for use in the process of this invention, since water hydrolyzes arsenic fluorosulfonate and since water in the reaction system forms hydrogen fluoride which in turn reacts with glass (if glass reaction vessels are used) to form silicon tetrafluoride as a by-product.

The product and process of this invention are illustrated in further detail in the following examples in which the proportions of ingredients are expressed in parts by weight unless otherwise noted.

Example I

Forty parts of arsenic trifluoride are added through a reflux condenser to a reaction vessel containing 160 parts of sulfur trioxide. There is a very considerable heat of reaction which causes the reaction mixture to reflux. When this initial heat of reaction subsides, the liquid is heated externally and refluxed for a period of one-half hour. The reaction mixture is distilled, giving two fractions.

The first fraction, boiling at 44°–124° C., is treated with concentrated sulfuric acid. This results in the formation of two layers. The top layer is separated and distilled, giving 22 parts of pyrosulfuryl fluoride (B. P. 51° C.).

The high boiling fraction of the reaction mixture boils at 138° C. and amounts to 60 parts of clear, colorless liquid. This is redistilled and the new compound arsenic fluorosulfonate is again found to boil at 137–138° C. at atmospheric pressure.

This compound has the following elemental analysis:

As, 28.42%; F, 20.61%; S, 20.59%
28.51%

This elemental analysis of the arsenic fluorosulfonate corresponds to an atomic ratio of arsenic to fluorine to sulfur of 2:6:3. To obtain a compound with this atomic ratio 2 moles of arsenic trifluoride must have reacted with 3 mols of sulfur trioxide. The oxygen is obtained by difference in the usual manner and the following calculations show that the ratio of arsenic to fluorine to sulfur to oxygen in arsenic fluorosulfonate is 2:6:3:9.

|   | Weight Percentages | Atomic Weight | Quotients | Ratios | Ratios In Whole Numbers |
|---|---|---|---|---|---|
| As | 28.47 | 74.91 | 0.4 | 1.0 | 2 |
| F  | 20.61 | 19.00 | 1.1 | 3.0 | 6 |
| S  | 20.59 | 32.07 | 0.6 | 1.5 | 3 |
| O  | 30.33 | 16.00 | 1.9 | 4.7 | 9 |
|    | 100.00 |     |     |     |    |

These calculations from the elemental analysis show that arsenic fluorosulfonate has the chemical composition represented by the formula $As_2F_6S_3O_9$.

Example II

Eighty parts of sulfur trioxide are slowly added through a dropping funnel to a reaction vessel which is fitted with a reflux condenser and which is charged with 122 parts of arsenic trifluoride. During this addition the reaction mixture is vigorously stirred. After the addition is complete, the mixture is twice distilled. On the second distillation, there is obtained 125 parts of pure arsenic fluorosulfonate.

This example illustrates the exceptionally high yields of arsenic fluorosulfonate that are obtained when an excess of arsenic trifluoride is used.

Example III

Eighty parts of arsenic trifluoride are reacted with 300 parts of sulfur trioxide by the procedure described in Example II. Distillation of the reaction mixture gives 101 parts of arsenic fluorosulfonate boiling at 138° C. and 20 parts of the very toxic pyrosulfuryl fluoride boiling at 51° C.

*Example IV*

By separate leads into a nickel tubular reactor heated to 600°–630° C., arsenic trifluoride and sulfur trioxide are vaporized through the reaction tube by bubbling nitrogen through the liquid reactants. A total of 12.1 parts of sulfur trioxide and 14.7 parts of arsenic trifluoride are passed through the reaction tube during a period of two hours. At the exit end of the reaction tube, two conventional cold traps are placed. The first trap is at room temperature, and the second is cooled by liquid nitrogen. There is recovered in the first trap 21 parts of arsenic fluorosulfonate.

There is also obtained 2.5 parts of material in the liquid nitrogen-cooled trap which is shown by infrared analysis to consist of sulfur dioxide and silicon tetrafluoride. The silicon tetrafluoride is a result of the presence of moisture in the reaction system. Water in the reaction system gives hydrogen fluoride which in turn reacts with glass in the glass receivers, or traps, with the formation of silicon tetrafluoride.

The formation of arsenic florosulfonate under the above reaction conditions clearly demonstrates the uniquely high thermal stability of this fluorosulfonate.

*Example V*

The procedure outlined in Example IV is followed with the exception that the nickel reaction tube is packed with quarter-inch calcium fluoride pellets, and the temperature of the reaction zone is maintained at 650°–690° C. During a period of one hour there are passed 2.5 parts of arsenic trifluoride and 6.4 parts of sulfur trioxide through the reaction zone. There is obtained 4 parts of liquid arsenic fluorosulfonate in the trap maintained at room temperature.

There is obtained 0.9 part of material in the liquid nitrogen-cooled trap. Infrared analysis of this latter material shows it to consist of sulfuryl fluoride, sulfur dioxide, and silicon tetrafluoride.

This example also illustrates the high thermal stability of arsenic fluorosulfonate.

*Example VI*

A reaction vessel cooled by ice is charged with 122 parts of arsenic trifluoride. There is then added slowly 160 parts of sulfur trioxide, about 30 minutes being required. The reaction product is then precision distilled, and there is obtained 206 parts of arsenic fluorosulfonate boiling at 140.5° C./765.5 mm.

The arsenic fluorosulfonate of this invention is useful in a wide variety of applications. It is useful as a catalyst in addition polymerization; it is a fluorinating agent and can be used for halogen exchange reactions to prepare fluorocarbons; it is a strong sulfonating agent; and it can be pyrolyzed to sulfuryl fluoride at temperatures above 700° C.

More particularly, when one part of arsenic fluorosulfonate is added to 50 parts of styrene at room temperature, the styrene polymerizes exothermally, within about five minutes after addition of the arsenic compound, to a transparent, slightly yellow solid.

The use of arsenic fluorosulfonate as a fluorinating agent is demonstrated by the following experiment: Forty-four parts of arsenic fluorosulfonate and 30 parts of carbon tetrachloride are heated in a corrosion-resistant vessel capable of withstanding high pressures, at 350° C. under autogenous pressure for a period of three hours. At the end of this time the gaseous reaction product is collected and subjected to infrared absorption analysis. This infrared analysis shows that the product contains chlorotrifluoromethane and dichlorodifluoromethane together with carbonyl fluoride, sulfuryl fluoride, carbonyl chlorofluoride, sulfur dioxide, and silicon tetrafluoride. Dichlorodifluoromethane and chlorotrifluoromethane are used commercially as refrigerants.

Arsenic fluorosulfonate is a very vigorous sulfonating agent. It reacts violently with aromatic compounds such as benzene or toluene. For example, when 10 parts of arsenic fluorosulfonate is slowly added to an excess, 25 parts, of benzene, reaction is very vigorous, and it is necessary to moderate it by external cooling with ice. The resultant product contains benzenesulfonic acid as shown by infrared absorption bands. On pouring part of the liquid product into water, a white crystalline solid precipitates. This solid is recrystallized from benzene, and elemental analysis shows it to be diphenylsulfone.

*Analysis.*—Calc'd for $(C_6H_5)_2SO_2$: C, 66.02%; S, 14.69%; H, 4.62%. Found: C, 66.17%; S, 14.57%; H, 4.61%.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows.

I claim:

1. Arsenic fluorosulfonate characterized by being a liquid at room temperature and having the chemical composition represented by the formula $As_2F_6S_3O_9$.

2. Arsenic fluorosulfonate characterized by being a liquid at room temperature, boiling at 138° C. under normal atmospheric pressure without decomposition, and in which the atomic ratio of arsenic to fluorine to sulfur to oxygen is 2:6:3:9.

References Cited in the file of this patent

Mellor: "Comprehensive Treatise on Inorganic and Theoretical Chemistry," vol. 10, 1930, pages 684 to 685.